(12) United States Patent
Mazuk et al.

(10) Patent No.: US 8,301,867 B1
(45) Date of Patent: Oct. 30, 2012

(54) SECONDARY CORE ONU TO OLT VIA INTERNAL EPON BUS COUPLED MULTI-CORE PROCESSOR FOR INTEGRATED MODULAR AVIONIC SYSTEM

(75) Inventors: Daniel E. Mazuk, Marion, IA (US); Clifford R. Klein, Marion, IA (US); Daniel J. Goiffon, Cedar Rapids, IA (US); Neal J. Bohnenkamp, Cedar Rapids, IA (US); Charles F. Steffen, Cedar Rapids, IA (US); David A. Miller, Swisher, IA (US); Robert H. Pulju, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 556 days.

(21) Appl. No.: 12/538,672

(22) Filed: Aug. 10, 2009

(51) Int. Cl.
*G06F 15/16* (2006.01)
(52) U.S. Cl. .................. 712/36; 398/66; 712/29
(58) Field of Classification Search .................. None
See application file for complete search history.

(56) References Cited

U.S. PATENT DOCUMENTS

| | | | |
|---|---|---|---|
| 7,001,082 B2 * | 2/2006 | Morrison | ................. 385/88 |
| 7,130,724 B2 | 10/2006 | Petersen | |
| 7,421,526 B2 | 9/2008 | Fletcher | |
| 7,933,518 B2 * | 4/2011 | Li et al. | ................. 398/22 |
| 8,078,055 B1 * | 12/2011 | Mazuk et al. | ................. 398/66 |
| 2006/0234787 A1 | 10/2006 | Lee | |
| 2008/0217471 A1 | 9/2008 | Liu | |
| 2009/0083368 A1 * | 3/2009 | Stayton et al. | ................. 709/202 |

* cited by examiner

*Primary Examiner* — Kenneth Kim
(74) *Attorney, Agent, or Firm* — Donna P. Suchy; Daniel M. Barbieri

(57) ABSTRACT

A multi-core processor system including a main processor, an internal EPON bus, and a plurality of secondary core processors. The main processor includes a processing unit; an offload engine operatively connected to the processing unit for routing data to and from the processing unit; a plurality of main processor optical network units (ONU's) operatively connected to the offload engine; and, a dual optical line terminal (OLT) operatively connected to the offload engine. The internal EPON bus is operatively connected to the OLT. The plurality of secondary core processors are located physically separate from the main processor, each secondary core processor having a respective secondary core processor ONU being operatively connected to the main processor via the internal EPON bus. A number of the multi-core processor systems can be used to form an integrated modular avionics (IMA) system when operatively connected to remote data concentration components via an external EPON bus connected to the dual OLTs of the multi-core processor systems.

11 Claims, 6 Drawing Sheets

Multi-Core Processor Architecture

Multi-Core Processor Architecture Type 2

Multi-Core Processor Architecture Type 3

SECONDARY CORE ONU TO OLT VIA INTERNAL EPON BUS COUPLED MULTI-CORE PROCESSOR FOR INTEGRATED MODULAR AVIONIC SYSTEM

BACKGROUND OF THE INVENTION

1. Field of the Invention

The present invention relates generally to avionics systems and more particularly to an improved multi-core processor architecture for use in an integrated modular avionics (IMA) system.

2. Description of the Related Art

Modern onboard avionics networks serve to provide data transfer between various components of an aircraft. Avionics systems typically have a variety of systems that provide data to processing components of the aircraft or exchange data among one or more components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like.

In some aircraft systems, the avionics network may be constructed with an Aeronautical Radio Inc. (ARINC) 429 data bus capable of supporting communication between many components. More recently, Ethernet networks have been used in avionic network environments by leveraging Commercial Off The Shelf (COTS) technology to increase bandwidth and reduce cost.

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. In an avionics network environment, the Ethernet network typically has different components that subscribe to the avionics network and connect to each other through switches. Each network subscriber can send packets in digital form, at controlled rates, to one or more other subscribers. When a switch receives the packets, the switch determines the destination equipment and directs or switches the packets to such equipment.

Such Ethernet networks may include ARINC-664 based networks. In a switched full-duplex Ethernet type network, the term "full-duplex" refers to sending and receiving packets at the same time on the same link, and the term "switched" refers to the packets being switched in switches on appropriate outputs. However, the ARINC-664 network uses multiple switches and redundant paths to route data, point-to-point or point-to-multipoint across the switches. Typically, remote data concentrators are connected using a wired ARINC-664 network.

Current Integrated Modular Avionics (IMA) architectures are reliant on data concentrators to bring the aircraft system I/O into the IMA system. The data concentrators are located remotely within the aircraft to reduce the wire weight of the system. Typically they are connected by the IMA backbone bus.

Present applicants Daniel Mazuk and David Miller are co-applicants of U.S. Ser. No. 12/151,249, filed May 5, 2008, entitled "Passive Optical Avionics Network," which is directed to a passive optical avionics network system and method that comprises: (a) an optical line terminal (OLT); (b) at least one optical network unit (ONU); (c) a fiber optic bus operably coupling the OLT and the ONU; and (d) an avionics module operably coupled to the ONU. An integrated modular avionics (IMA) system in accordance with the network system comprises: (a) a line-replaceable unit (LRU), the LRU comprising: (i) a processing unit; and (ii) an optical line terminal (OLT); (b) at least one optical network unit (ONU); (c) a fiber optic bus operably coupling the LRU and the ONU; and (d) an avionics module operably coupled to the ONU. U.S. Ser. No. 12/151,249 is incorporated herein by reference, for all purposes, in its entirety.

Some of the locations of the remote data concentrators (RDC's) are a very hostile environment or the backbone bus wire needs to travel through the hostile environment to get to the RDC.

These difficult installations could benefit from a wireless link to/from the IMA backbone bus.

Multi-core processors today share multiple internal resources which causes the certification to be problematic. The internal IP of the multi-core processor is held with the supplier and is not shared with the users so a detail safety analysis of the shared resources cannot be performed.

All IMA architecture suppliers have either used single core processors or shut down the extra cores of a multi-core processor because they cannot prove the safety of using the extra cores thus the use of multi-core processors are not certifiable.

SUMMARY OF THE INVENTION

In a broad aspect, the present invention is embodied as a multi-core processor system including a main processor, an internal EPON bus, and a plurality of secondary core processors. The main processor includes a processing unit; an offload engine operatively connected to the processing unit for routing data to and from the processing unit; a plurality of main processor optical network units (ONU's) operatively connected to the offload engine; and, a dual optical line terminal (OLT) operatively connected to the offload engine. The internal EPON bus is operatively connected to the OLT. The plurality of secondary core processors are located physically separate from the main processor, each secondary core processor having a respective secondary core processor ONU being operatively connected to the main processor via the internal EPON bus.

In one alternative embodiment, each of the secondary core processors further includes a secondary core processor OLT for hosting an associated secondary core processor external EPON bus. In another alternative embodiment each of the secondary core processors also includes a wireless transceiver for connection to a wireless network. The multi-core processor system may also operate in a mixed wired/wireless configuration. Using wireless technology allows wireless data concentration components to be operably connected with multiple data paths via the wireless network to enhance communication availability. The wireless data concentration components are preferably operably connected via a wireless (Ultra-Wideband) UWB network.

In another broad aspect, the present invention is embodied as an integrated modular avionics (IMA) system including a number of multi-core processor systems, as discussed above, and remote data concentration components operatively connected to those multi-core processor systems via an external EPON bus connected to the dual OLTs of the multi-core processor systems. Failure of one or more of the plurality of secondary core processors does not effect the external EPON bus functionality.

The present invention is particularly advantageous in avionics applications because it allows avionics functions to be hosted on the secondary core processors and not be effected by any of the external devices on the external EPON bus, and vice-versa. Thus, the faults are isolated. This improves the processing capability of the IMA system. In the present system, aircraft functions may be separated, such as, air brakes and wheel brakes, by using different secondary core processors, in different main processors in the IMA system. The secondary core processors can each host its own EPON tree and connect its own member systems to it.

The wireless capability allows various electronic units to be directly connected to the secondary core processors that are hosting the software for their particular function. Additionally, use of wireless capabilities provides for a very significant reduction in the aircraft wire weight. It can be used in hostile environments within the aircraft, e.g. the rotor burst zone. It does not affect the safety signal routing analysis, thus providing a very robust system, immune to certain effects that would render conventional wired or wireless systems inoperative.

Other objects, advantages, and novel features will become apparent from the following detailed description of the invention when considered in conjunction with the accompanying drawings.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
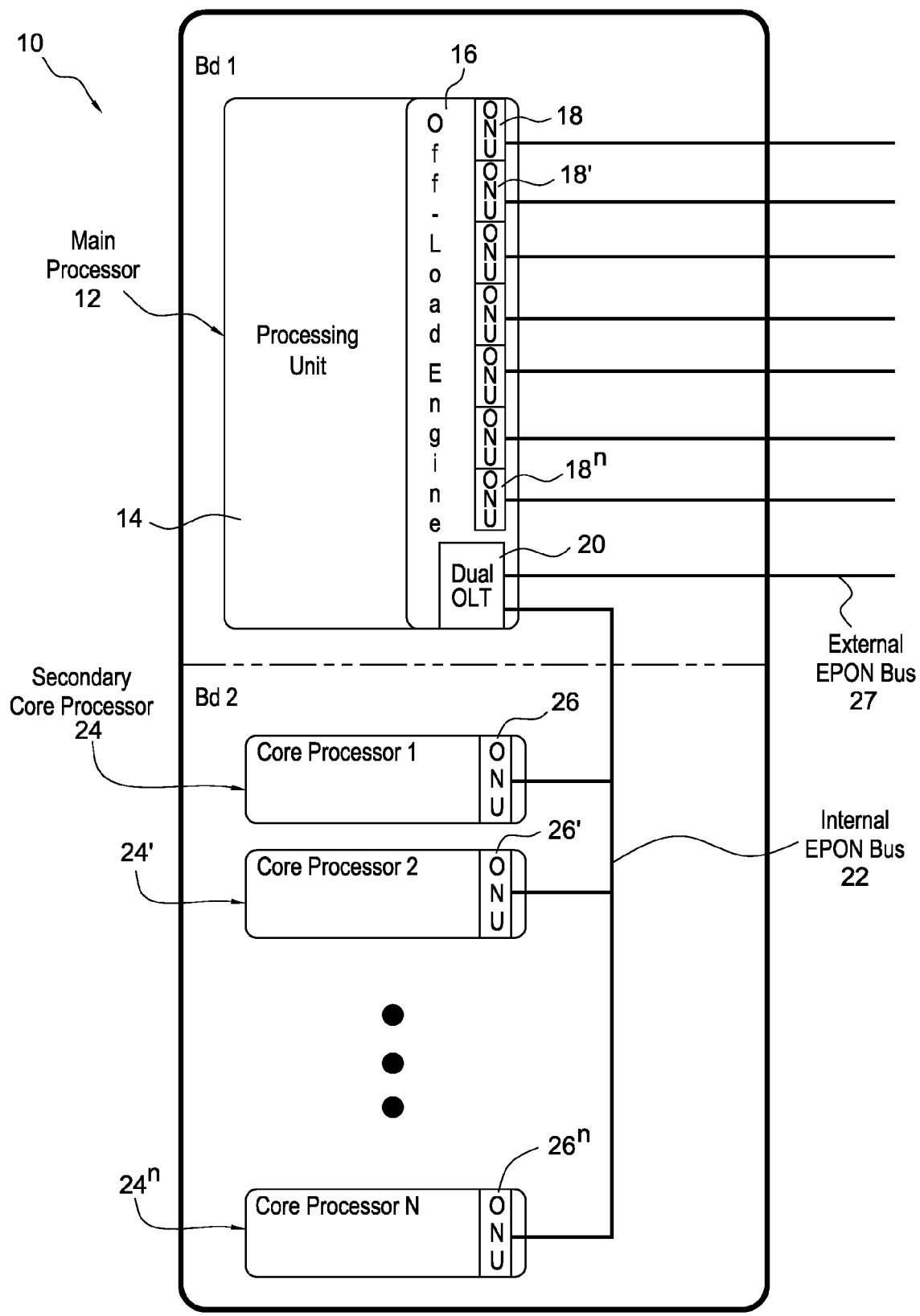
FIG. 1 illustrates a first embodiment of the multi-core processor system of the present invention.

Referring now to the drawings and the characters of reference marked thereon, FIG. 1 illustrates a first embodiment of the multi-core processor system of the present invention, designated generally as 10. The system 10 includes a main processor, designated generally as 12. The main processor 12 includes a processing unit 14. An offload engine 16 is operatively connected to the processing unit 14 for routing data to and from the processing unit 14. A plurality of main processor optical network units (ONU's) 18, 18', ..., 18" are operatively connected to the offload engine 16. A dual optical line terminal (OLT) 20 is operatively connected to the offload engine 16.

An internal EPON bus 22 is operatively connected to the OLT 20. Secondary core processors 24, 24', ..., 24" are located physically separate from the main processor 12. Generally, they are located on separate printed circuit boards. Each secondary core processor 24 has a respective secondary core processor ONU 26, 26', ..., 26" operatively connected to the main processor via the internal EPON bus 22. The internal EPON bus 22 is configured as a separate EPON tree from the external EPON bus 27, i.e. the main processor's EPON tree. This allows the "layer two" switch within the OLT 20 to connect the secondary core processors 24, 24', ..., 24".

As used herein the term dual optical line terminal (OLT) is defined broadly to include both a dual optical terminal and two OLTs acting in conjunction. The OLT may be, for example, a commercially available product such as the TK3723 model manufactured by Teknovus, Inc. Similarly, the ONUs are commercially available from, for example, Teknovus, Inc.

Figure 2:
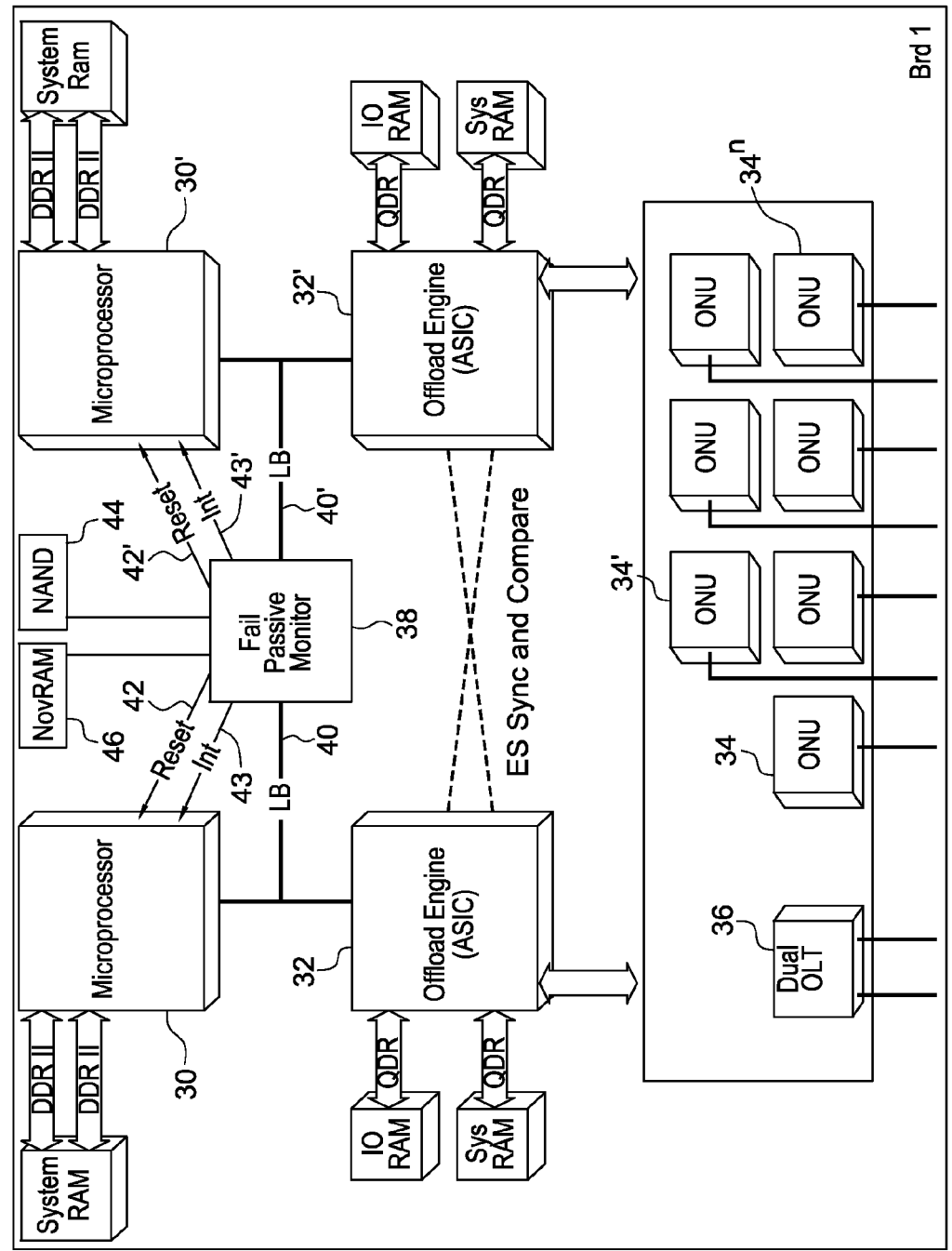
FIG. 2 is a schematic illustration of the main processor architecture of the multi-core processor system.

Referring now to FIG. 2, a low-level illustration of an example multi-core processor system (i.e. fail-passive computing resource module or line replaceable unit (LRU)), designated generally as 28, is shown. A processing unit 30 of an avionics computing resource element of the fail-passive computing resource module 28 includes an offload engine 32 which is operably coupled to ONU's 34, 34', ..., 34" and the dual OLT 36. The offload engine 32 may be an application specific integrated circuit (ASIC) tasked with 1) routing outgoing data from the processor 30 (e.g. a processor such as model MPC5567 manufactured by Freescale Semiconductor) to the ONU's 34 for transmission to remote concentration components distributed about the aircraft; and, 2) routing outgoing data to the dual OLT 36. Similarly, a second offload engine 32' may be tasked with routing incoming data (e.g. data originating from a sibling processing unit 30') between the ONU's 34 and the processor 30' and between the dual OLT and the processing unit 30'. In this fail-passive processing example, the offload engine 32 and offload engine 32' may each include two internal components. Each engine 30, 30' may provide interface capability with a respective ONU 34 and dual OLT 36. The other component may synchronize, cross-feed, and cross-compare the data such that both processing units 30, 30' are provided with correct and consistent data. For other applications where fail-passive processing is not needed, a single processing unit 30 and offload engine 32 may be employed, where the offload engine 32 provides the interface to the ONUs 34 and dual OLT 36.

For the fail-passive example shown, a fail-passive monitor 38 may provide a cross-comparison function between local buses (LBs) 40, 40' associated with each processing unit 30, 30'. The fail-passive monitor 38 may detect differences in data provided to each processing unit 30, 38' which may indicate a failure, thereby ensuring the integrity of data. This fail-passive monitor 38 may further provide functions which aid in the synchronization of the processors, allowing them to produce identical results on identical data for a fault-free case. Synchronized resets 42, 42' and synchronized interrupts 43, 43' may be provided to both processors to maintain synchronization for switching among multiple processes. As an implementation convenience, the fail-passive monitor 38 may provide interfaces with memory devices that are not required to be dual for fail-passivity (e.g. a NAND program memory 44; and, non-volatile data memory 46). For such cases, other means such as CRCs may be used to ensure the necessary data integrity rather than use of a dual configuration.

Although FIG. 2 shows the offload engines as being discrete from the dual OLT and the ONUs these items may be a single component, for example, embodied as an ASIC.

Figure 3:
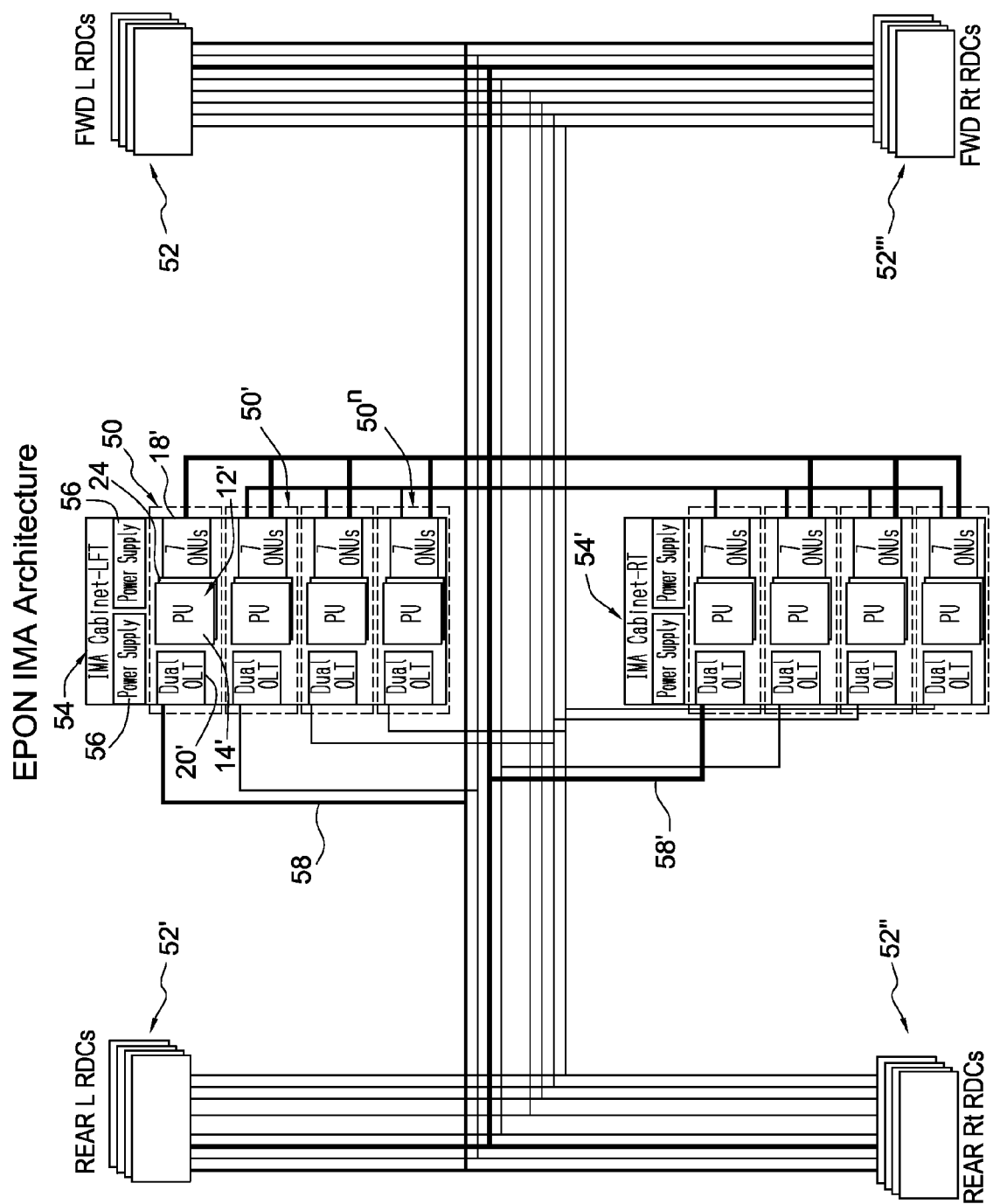
FIG. 3 illustrates a multi-core processor system implemented in an integrated modular avionics (IMA) system.

Referring now to FIG. 3, an integrated modular avionics (IMA) system is illustrated, designated generally as 48. The IMA system 48 includes a plurality of multi-core processor systems (i.e. common computing modules), designated generally as 50-50". Each of the multi-core processor systems 50 includes a main processor 12', as discussed above. The main processor 12' includes a processing unit 14', an offload engine (not shown in this figure), a plurality of main processor optical network units (ONU's) 18' and a dual optical OLT 20'. Furthermore, consistent with the FIG. 1 discussion above, the main processor includes an internal EPON bus (not shown) operatively connected to the OLT 20'; and, a plurality of secondary core processors 24, located physically separate from the main processor 12'. Each secondary core processor 24 has a respective secondary core ONU (not shown) being operatively connected to the main processor via the internal EPON bus. A plurality of remote data concentration components 52 are operatively connected to the plurality of multi-core processor systems 50-50″ via an external EPON bus 58 connected to the dual OLT 14'. Failure of one or more of the plurality of secondary core processors 24 does not effect the external EPON bus functionality.

The only shared processor resource is the internal EPON bus 22 (see FIG. 1) configured as a separate EPON tree from the external EPON bus 58, 58', i.e. the main processor's EPON tree. This allows the "layer two" switch within the dual OLT 20' to connect the secondary "Virtual" core processors to their I/O and the standard AFDX message exchange between any processor in the IMA system 48.

The "Virtual" secondary core processors can improve the overall safety analysis by using dissimilar processors, i.e. several of them could be Intel Celeron 460 processors and mixed micro-controllers, e.g. MPC-5567. An aircraft function then can be hosted on four different processor types (e.g. Freescale MPC-8578, Intel Celeron 460, Intel Celeron 460, Freescale MPC-5567). Also these secondary "Virtual" core processors can be processor cores hosted in an FPGA/ASIC (e.g. the IP for 603c cores could be hosted in an ASIC).

Since the "Virtual" secondary core processors are on their own EPON tree, when there is a failure in any of them, the main processor can "prune" that tree without impacting the main backbone network. Thus, in a sense, there is a separate fault containment zone for the secondary "Virtual" core processors.

The IMA system 48 is implemented with a left IMA cabinet 54 that contains multiple multi-core processing systems (i.e. CCMs) 50-50″. These CCMs 50-50″ are preferably line-replaceable units (LRUs) designed to be replaced quickly at an airport ramp area and designed to common specifications so as to be interchangeable within multiple sockets within an avionics system as well as cross-compatible between multiple aircraft. The IMA cabinet 54 includes appropriate power supplies 56. Multiple power supplies 56 may provide redundancy in power sourcing. Typically, the IMA system 48 also includes an IMA cabinet 54' with similar components.

A single strand of fiber may go out from a given OLT 20' over a fiber optic bus 58 to a passive optical splitter (not shown) where the optical signal is divided into multiple branches. Additional passive optical splitters may also be incorporated downstream from the primary passive optical splitter to provide further branching for the optical signal.

The optical signal may be ported to remote data concentrators (RDCs) located in forward-right, forward-left, aft-left and/or aft-right positions, as indicated by numeral designations 52, 52', 52" and 52'", via external EPON fiber optical buses 58, 58'.

The main processor 12' processor may cause an OLT 20' to transmit data packets over the external EPON bus 58 which may be received by each of the ONUs located on the RDCs 52. Transmit and receive signals within the EPON-based system 48 may operate on different wavelengths allowing bi-directional operation over a single fiber. In the depicted configuration, data packets transmitted from an OLT 20' may be transmitted as a burst over all fiber optic bus lines 58, 58' to multiple ONUs on the RDCs 52, 52', 52" and 52'". The data packets may comprise an address header indicating a particular RDC to which the data packet is to be directed. An RDC may receive all data transmitted by the OLT 14' but may only process that data which is particularly addressed to that RDC while discarding all other data.

Alternately, the data packet may be sent generically (e.g. without the RDC ONU specific headers) to all RDCs where each RDC may independently analyze the data packet for compatibility with the data requirements of an associated avionics module. (As will be discussed below, the avionics modules may be flight control surface sensors, landing gear sensors, cabin climate control sensors, cockpit display devices, etc.)

Upstream communication from an ONU of an RDC to an OLT 20' may be governed by a time division multiple access (TDMA) protocol. The RDC's ONU may transmit in rapid succession, one after the other, each using a predetermined time slot. This allows multiple RDC ONUs to share the same bus while using only the part of the bandwidth that each requires. On powering up, the OLT 20' may institute a discovery procedure in which it determines which RDC ONUs are on a given bus and the round trip time to each RDC ONU. Subsequent to the discovery procedure, when an RDC ONU has data to transmit to an OLT 20' it may send a report in which it requests a slot (time) in which to transmit the data. In return the OLT 20' sends a gate to the RDC ONU which defines the time slot in which that ONU may transmit the data. Information from an OLT 20' to the one or more RDC ONUs is sent via a global broadcast. One or more RDC ONUs may transmit in rapid succession but are not limited to a given sequence. The transmissions may be in a random sequence depending on the needs of each RDC ONU to communicate data to the OLT 20'.

Figure 4:
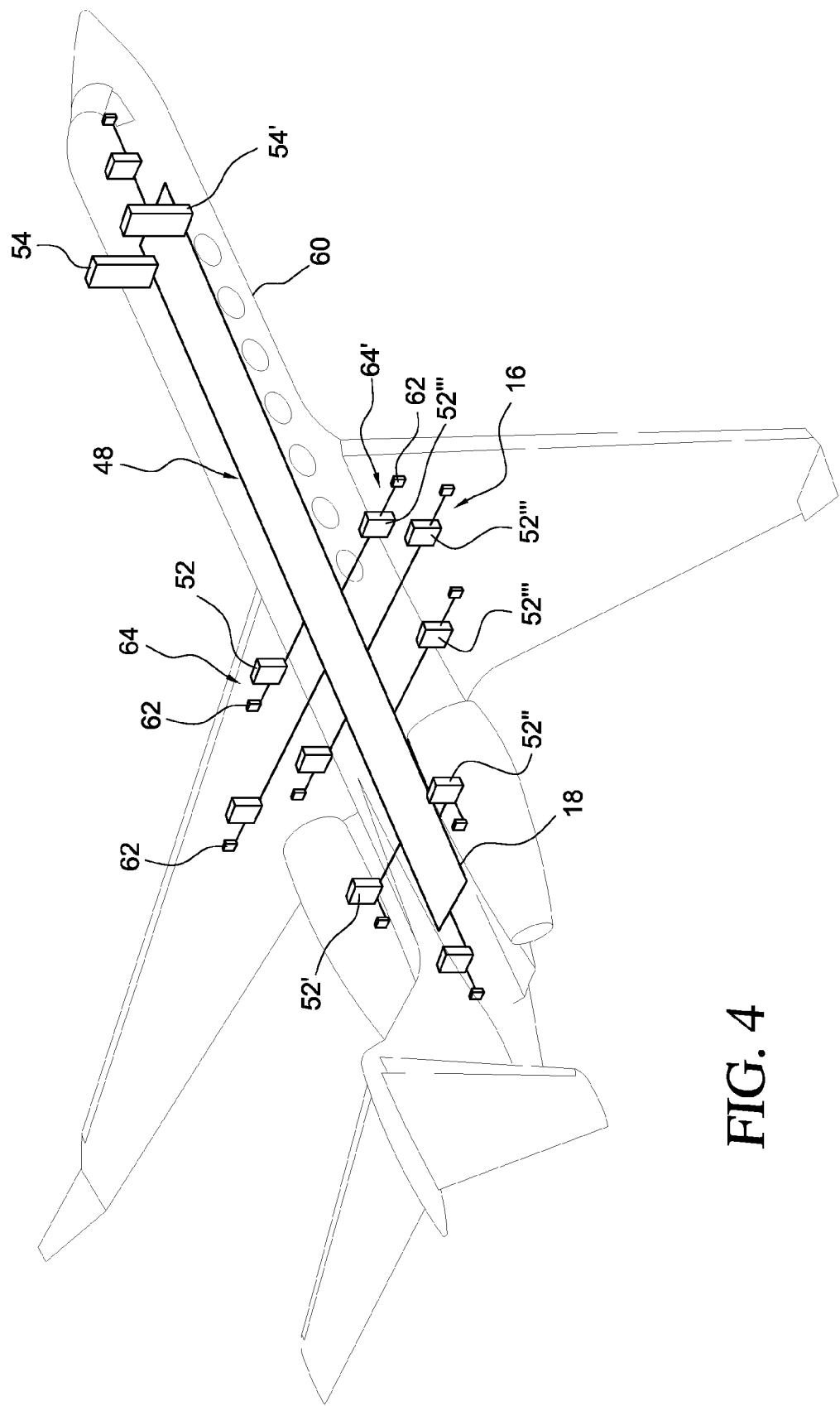
FIG. 4 illustrates an aircraft employing an integrated modular avionics (IMA) system utilizing a multi-core processor system of the present invention.

The IMA system 48 is shown implemented on an airplane 60, in FIG. 4. The RDC's 52, 52', 52" and 52'" are each utilized with one or more respective avionics modules 62 to form what may be termed as data concentration components, designated generally as 64, 64', . . . 64'". The avionics modules 62 may be flight control surface sensors, landing gear sensors, cabin climate control sensors, cockpit display devices, etc.

Each RDC 52 is preferably dual channel to provide the desired redundancy and fail-passive attributes. The RDC's 52 provide access into the system for the sensors and effectors. The manufacture of RDC's is well known to those skilled in this field. As an example, the RDC may utilize a Freescale MPC5567 processor.

Figure 5:
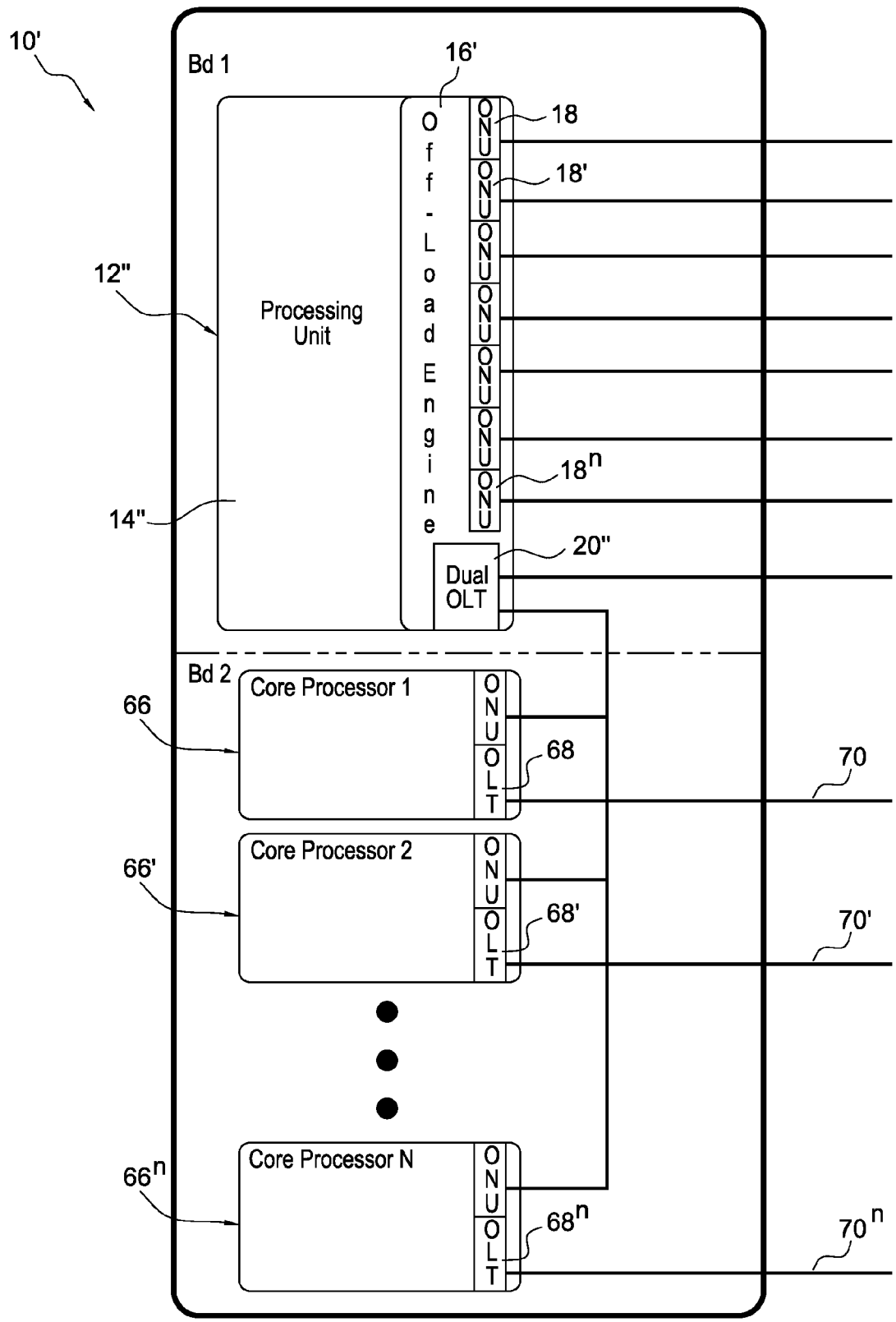
FIG. 5 illustrates another embodiment of the multi-core processor system in which each secondary core processor hosts its own EPON tree.

Referring now to FIG. 5, an embodiment of the multi-core processor system is illustrated in which each secondary core processor hosts its own EPON tree, the multi-core processor system being designated generally as 10'. As in the first embodiment the system 10' includes a main processor, designated generally as 12". The main processor 12" includes a processing unit 14". An offload engine 16' is operatively connected to the processing unit 14" for routing data to and from the processing unit 14". A plurality of main processor optical network units (ONU's) 18, 18', . . . , 18″ are operatively connected to the offload engine 16'. A dual optical line terminal (OLT) 20" is operatively connected to the offload engine 16'. This embodiment also includes a plurality of secondary core processors 66, 66', . . . , 66″, as in the previous embodiment. However, in this embodiment at least one of the plurality of secondary core processors further comprises a secondary core processor OLT 68 for hosting an associated secondary core processor external EPON bus 70. This serves to isolate a specific subsystem and dedicate it relative to a selected secondary core processor. This allows for rapid communication to specific subsystem resources, i.e. LRU's, RDC's, or remote electronics unit desired to be controlled, i.e. actuator on a landing gear, detection sensor, etc.

In summary, addition of the OLTs to the secondary core processors enables them to directly connect to their member systems without burdening the main processor. This also allows the secondary processors to act as agents/intermediaries for the main processor and filter/forward data to/from the main processor.

Figure 6:
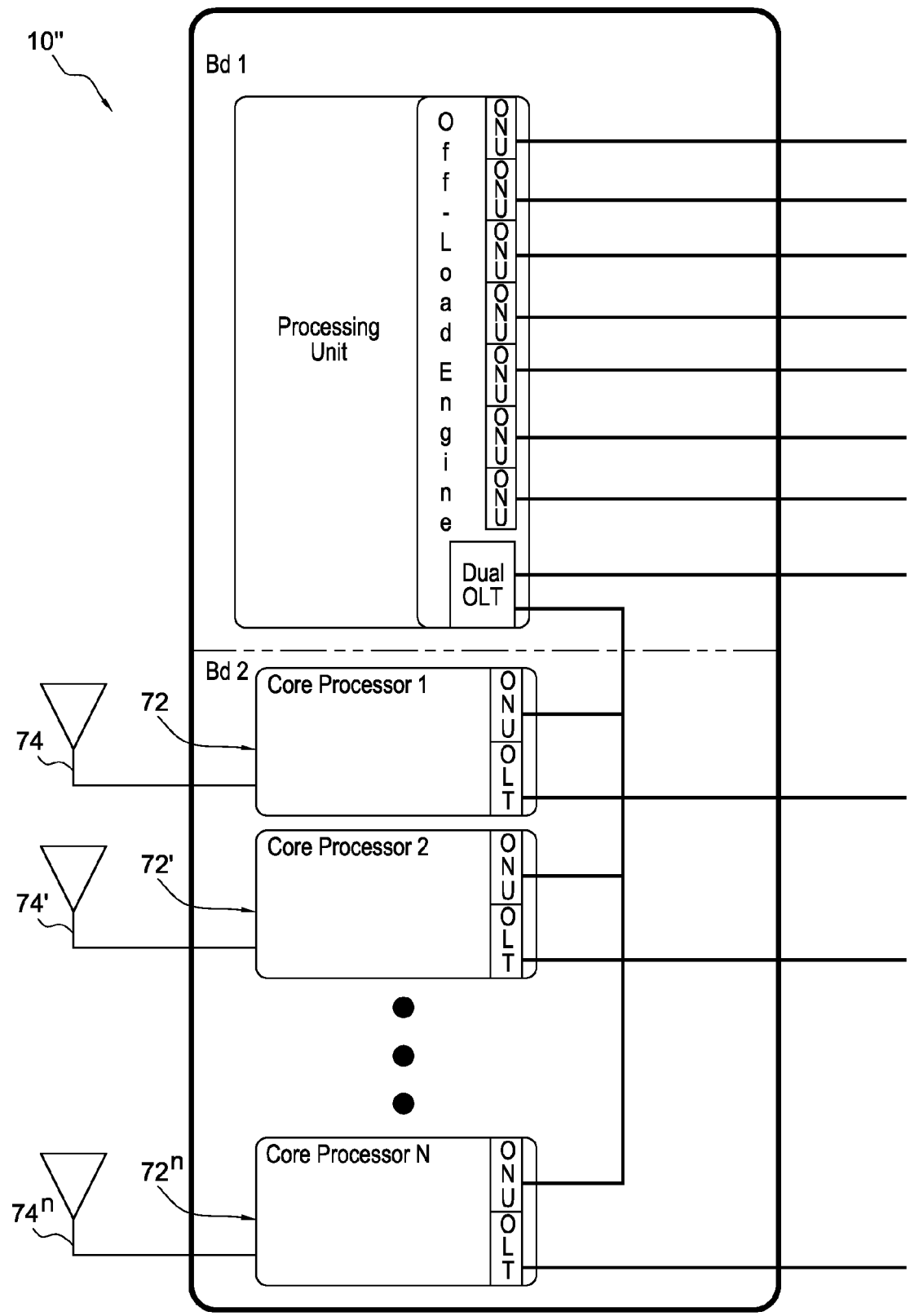
FIG. 6 illustrates another embodiment of the multi-core processor system of the present invention which is implemented as a wireless system.

Referring now to FIG. 6, an embodiment of the multi-core processor system is illustrated in which: 1) each secondary core processor hosts its own EPON tree and 2) the wireless connectivity is provided, the multi-core processor system being designated generally as 10". In this embodiment, the secondary core processors 72, 72', ..., 72" include wireless transceivers 74, 74', ..., 74". Again, this may be used with various electronic units where wireless capability is desired such as fire detection loop, smoke detectors, pressurization valves, etc.

The secondary processors may be connected to data concentration components via a wireless (Ultra-Wideband) UWB network as described in detail in co-applicants D. E. Mazuk, C. R. Klein, D. L. Goiffon, and N. J. Bohnenkamp, patent application entitled "Remote Concentration System for An Integrated Modular Avionics System", U.S. Ser. No. 12/378,952, filed on Feb. 20, 2009, incorporated herein by reference, for all purposes, in its entirety. Wireless sensor/effector assemblies for receiving the wireless transmission may include a UWB transceiver connected to an avionics module. The UWB transceiver may comprise, for example, CoAir™ chipsets manufactured by Sigma Designs.

It should be noted that while the various avionics modules are depicted as discrete distributed components, it will be recognized by one skilled in the art that such functionality (e.g. control functionality, sensor functionality, etc.) may be implemented in any number of forms including but not limited to software, hardware, firmware, application specific integrated circuitry (ASICs) and the like and may be configured as part of distributed or integrated systems without departing from the scope of the present disclosures. For example, the UWB transceiver can be incorporated with the avionics module.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A multi-core processor system, comprising:
   a) a main processor, comprising:
      i) a processing unit configured to function as a host processor for main processor functions;
      ii) an offload engine operatively connected to said processing unit for routing data to and from said processing unit;

iii) a plurality of main processor optical network units (ONU's) operatively connected to said offload engine; and, iv) a dual optical line terminal (OLT) operatively connected to said offload engine;

b) an internal EPON bus operatively connected to said OLT; and, c) a plurality of secondary core processors, located physically separate from said main processor, each secondary core processor having a respective secondary core processor ONU being operatively connected to said main processor via said internal EPON bus, said internal EPON bus being the only connection point for the secondary core processors to the main processor, thus the internal EPON bus is configured as a separate EPON tree from an external EPON bus of the main processor.

2. The multi-core processor system of claim 1, wherein at least one of said plurality of secondary core processors further comprises a secondary core processor OLT for hosting an associated secondary core processor external EPON bus.

3. The multi-core processor system of claim 1, wherein at least one of said plurality of secondary core processors further comprises:

a) a secondary core processor OLT for hosting a secondary core processor external EPON bus; and, b) a wireless transceiver for connection to a wireless network.

4. The multi-core processor system of claim 1, wherein said offload engine, said plurality of main processor ONU's and said dual OLT comprise a single application specific integrated circuit (ASIC).

5. An integrated modular avionics (IMA) system, comprising:

a) a plurality of multi-core processor systems, each comprising:

i) a main processor, comprising:

1. a processing unit configured to function as a host processor for main processor avionics functions;

2. an offload engine operatively connected to said processing unit for routing data to and from said processing unit;

3. a plurality of main processor optical network units (ONU's) operatively connected to said offload engine and, 4. a dual optical line terminal (OLT) operatively connected to said offload engine;

ii) an internal EPON bus operatively connected to said OLT; and, iii) a plurality of secondary core processors, located physically separate from said main processor, each secondary core processor having a respective secondary core ONU being operatively connected to said main processor via said internal EPON bus, said internal EPON bus being the only connection point for the secondary core processors to the main processor, thus the internal EPON bus is configured as a separate EPON tree from an external EPON bus of the main processor; and, b) a plurality of remote data concentration components operatively connected to said plurality of multi-core processor systems via an external EPON bus connected to said dual OLTs of said plurality of multi-core processors, wherein failure of one or more of said plurality of secondary core processors does not effect the external EPON bus functionality.

6. The IMA system of claim 5, wherein at least one of said plurality of secondary core processors further comprises a secondary core processor OLT for hosting an associated secondary core processor external EPON bus.

7. The IMA system of claim 5, wherein at least one of said plurality of secondary core processors further comprises:

a) a secondary core processor OLT for hosting a secondary core processor external EPON bus; and, b) a wireless transceiver for connection to a wireless network.

8. The IMA system of claim 5, wherein at least one of said offload engines and its associated ONU's and dual OLT comprise a single application specific integrated circuit (ASIC).

9. The IMA system of claim 5, wherein said plurality of remote data concentration components comprises a plurality of remote wireless data concentrator (RDC) assemblies, each RDC assembly comprising:

a) a remote data concentrator (RDC); and, b) an avionics module operably connected to said RDC.

10. The IMA system of claim 5, wherein said plurality of remote data concentration components comprises a plurality of remote data concentrator (RDC) assemblies, each RDC assembly comprising:

a) a remote data concentrator (RDC) comprising a UWB transceiver; and, a microprocessor operably connected to said UWB transceiver; and, b) an avionics module operably connected to said RDC.

11. The IMA system of claim 5, wherein each of said remote data concentration components, comprise a plurality of wireless sensor/effector assemblies, each wireless sensor/effector assembly, comprising:

a) a UWB transceiver; and, b) an avionics module operably connected to said UWB, wherein said avionics module is one of a set of aircraft avionics modules selected from the set consisting of: flight control surface sensors; landing gear sensors; cabin climate control sensors; and, cockpit display devices.

* * * * *